US012096265B2

(12) United States Patent
Cui et al.

(10) Patent No.: US 12,096,265 B2
(45) Date of Patent: *Sep. 17, 2024

(54) ELECTRONIC DEVICE AND METHOD FOR WIRELESS COMMUNICATIONS

(71) Applicant: Sony Group Corporation, Tokyo (JP)

(72) Inventors: Tao Cui, Beijing (CN); Wei Ren, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,070

(22) Filed: Aug. 25, 2022

(65) Prior Publication Data

US 2022/0408298 A1 Dec. 22, 2022

Related U.S. Application Data

(63) Continuation of application No. 16/632,545, filed as application No. PCT/CN2018/102149 on Aug. 24, 2018, now Pat. No. 11,477,677.

(30) Foreign Application Priority Data

Aug. 31, 2017 (CN) .......................... 201710771352.0

(51) Int. Cl.
*H04B 17/309* (2015.01)
*H04L 5/00* (2006.01)
(Continued)

(52) U.S. Cl.
CPC .......... *H04W 24/10* (2013.01); *H04B 17/309* (2015.01); *H04L 5/0048* (2013.01);
(Continued)

(58) Field of Classification Search
None
See application file for complete search history.

(56) References Cited

U.S. PATENT DOCUMENTS

2009/0275334 A1 11/2009 Xie et al.
2011/0286433 A1 11/2011 Kiao et al.
(Continued)

FOREIGN PATENT DOCUMENTS

CN 103813376 A 5/2014
CN 105580297 A 5/2016
(Continued)

OTHER PUBLICATIONS

International Search Report and Written Opinion mailed on Nov. 21, 2018 for PCT/CN2018/102149 filed on Aug. 24, 2018, 8 pages.
(Continued)

*Primary Examiner* — Scott M Sciacca
(74) *Attorney, Agent, or Firm* — XSENSUS LLP

(57) ABSTRACT

Provided are an electronic device and a method for wireless communications, comprising a processing circuit configured to perform the following steps: according to an acquired measurement configuration, measuring a new radio synchronized signal (NR-SS) from a serving cell and one or more target cells to obtain a first measurement result; according to the measurement configuration, measuring a channel state information reference signal (CSI-RS) from the serving cell and the one or more target cells to obtain a second measurement result; and generating a measurement report comprising the first measurement result and the second measurement result.

18 Claims, 11 Drawing Sheets

(51) Int. Cl.
| | |
|---|---|
| *H04W 16/28* | (2009.01) |
| *H04W 24/08* | (2009.01) |
| *H04W 24/10* | (2009.01) |
| *H04W 36/00* | (2009.01) |
| *H04W 36/30* | (2009.01) |
| *H04W 36/32* | (2009.01) |

(52) U.S. Cl.
CPC ........... *H04W 16/28* (2013.01); *H04W 24/08* (2013.01); *H04W 36/00835* (2018.08); *H04W 36/30* (2013.01); *H04W 36/32* (2013.01)

(56) References Cited

U.S. PATENT DOCUMENTS

| | | | | |
|---|---|---|---|---|
| 2012/0099463 | A1* | 4/2012 | Saito | H04B 17/327 |
| | | | | 370/252 |
| 2014/0133465 | A1* | 5/2014 | Johansson | H04W 76/18 |
| | | | | 370/332 |
| 2016/0037425 | A1 | 2/2016 | Van Lieshout et al. | |
| 2017/0048860 | A1 | 2/2017 | Damnjanovic et al. | |
| 2019/0159087 | A1 | 5/2019 | Kordybach et al. | |
| 2019/0182682 | A1 | 6/2019 | Kim et al. | |
| 2019/0327651 | A1* | 10/2019 | Yiu | H04W 36/0058 |
| 2020/0022040 | A1 | 1/2020 | Chen et al. | |
| 2020/0068457 | A1 | 2/2020 | You et al. | |
| 2020/0112993 | A1 | 4/2020 | Tsai et al. | |
| 2020/0229053 | A1* | 7/2020 | Pakniat | H04W 36/00837 |
| 2020/0374727 | A1* | 11/2020 | Da Silva | H04W 72/0453 |

FOREIGN PATENT DOCUMENTS

| | | |
|---|---|---|
| CN | 105723771 A | 6/2016 |
| CN | 105917716 A | 8/2016 |
| CN | 106165323 A | 11/2016 |
| CN | 106550412 A | 3/2017 |
| WO | 2014/019168 A1 | 2/2014 |

OTHER PUBLICATIONS

Extended European search report issued on Jul. 27, 2020, in corresponding European patent Application No. 18852624.8, 12 pages.

Samsung, "Cell measurement with NR-SS and CSI-RS", 3GPP TSG-RAN WG2 2017 RAN2#97bis Meeting, R2-1703724, Apr. 3-7, 2017, total 5 pages, Spokane, USA.

Ericsson, "Selection of cells and beams to be included in the measurement report", 3GPP TSG-RAN WG2 #99, Tdoc R2-1708584, Aug. 21-25, 2017, total 4 pages, Berlin, Germany.

Ericsson, "Filtering of connected mode RS", 3GPP TSG-RAN WG1 Meeting #87, R1-1611907, Nov. 14-18, 2016 Total 7 pages, Reno, Nevada, USA.

Huawei et al., "Allocation of appropriate RACH resources for handover", 3GPP TSG-RAN WG2 #99, R2-1708883, Aug. 21-25, 2017, total 6 pages, Berlin, Germany.

* cited by examiner

ELECTRONIC DEVICE AND METHOD FOR WIRELESS COMMUNICATIONS

CROSS-REFERENCE TO RELATED APPLICATIONS

The present application is a continuation of U.S. application Ser. No. 16/632,545, filed Jan. 21, 2020, which is based on PCT filing PCT/CN2018/102149, filed Aug. 24, 2018, which claims the priority to Chinese Patent Application No. 201710771352.0, filed Aug. 31, 2017, the entire contents of each are incorporated herein by reference.

TECHNICAL FIELD

Embodiments of the present disclosure generally relate to the field of wireless communications, in particular to channel measurement and cell handover (HO) in a new radio (NR) system, and more particular to an electronic apparatus and a method for wireless communications.

BACKGROUND

In the LTE communication system, a handover process between cells has complete definition. For example, a serving cell, that is, a cell currently providing service to users, notifies the users that it is necessary to report the measurement report periodically or aperiodically via high layer signaling, and allocates uplink transmission resources for the user to report the measurement report via physical layer signaling. The user measures a receiving power of a cell-specific reference signal (CRS) from the serving cell and multiple target cells possibly to be handed over to, and reports the measurement result to a base station of the serving cell. The base station of the serving cell determines whether to perform handover according to a handover triggering event.

Compared with the LTE system, the concept of CRS is removed from the NR system, and the concept of beam management is added in the NR system.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided, which includes processing circuitry. The processing circuitry is configured to: measure, based on acquired measurement configuration, new radio synchronized signals (NR-SSs) from a serving cell and one or more target cells, to acquire a first measurement result; measure, based on the measurement configuration, channel state information reference signals (CSI-RSs) from the serving cell and the one or more target cells, to acquire a second measurement result; and generate a measurement report comprising the first measurement result and the second measurement result.

According to another aspect of the present disclosure, an electronic apparatus for wireless communications is provided, which includes processing circuitry. The processing circuitry is configured to: generate information of measurement configuration for a user, where the measurement configuration includes configuration for the user to measure NR-SSs from a serving cell and one or more target cells to acquire a first measurement result and configuration for the user to measure CSI-RSs from the serving cell and the one or more target cells to acquire a second measurement result; and acquire, from the user, a measurement report of the first measurement result and the second measurement result acquired by the user by measuring according to the measurement configuration.

According to another aspect of the present disclosure, a method for wireless communications is provided, which includes: based on acquired measurement configuration, measuring NR-SSs from a serving cell and one or more target cells, to acquire a first measurement result, and measuring CSI-RSs from the serving cell and the one or more target cells, to acquire a second measurement result; and generating a measurement report comprising the first measurement result and the second measurement result.

According to another aspect of the present disclosure, a method for wireless communications is provided, which includes: generating information of measurement configuration for a user, wherein the measurement configuration comprises configuration for the user to measure NR-SSs from a serving cell and one or more target cells to acquire a first measurement result and configuration for the user to measure CSI-RSs from the serving cell and the one or more target cells to acquire a second measurement result; and acquiring, from the user, a measurement report of the first measurement result and the second measurement result acquired by the user by measuring according to the measurement configuration.

With the electronic apparatus and the method according to the present disclosure, both the NR-SS and the CSI-RS of each cell are measured, thereby obtaining a more accurate and comprehensive measurement result of channel quality of each cell.

According to other aspects of the present disclosure, there are further provided computer program codes and computer program products for implementing the methods above, and a computer-readable storage medium having recorded thereon the computer program codes for implementing the methods described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
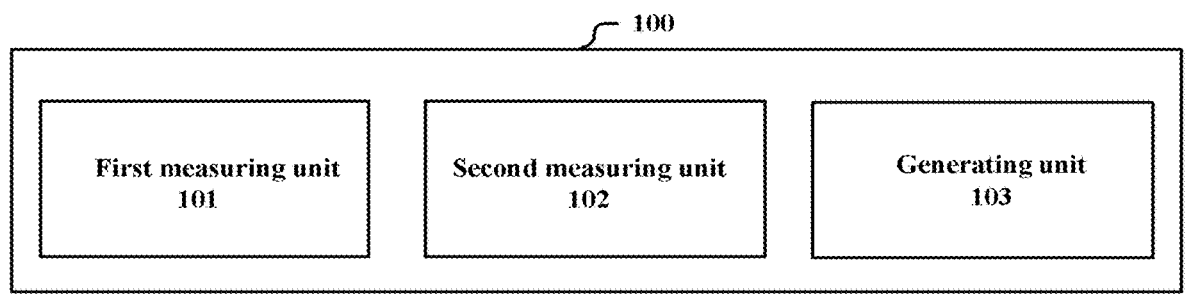
FIG. 1 is a block diagram of functional modules of an electronic apparatus for wireless communications according to an embodiment of the present disclosure.

As described above, since CRS is removed from the NR system, other reference signals may be measured. FIG. 1 is a block diagram of functional modules of an electronic apparatus 100 for wireless communications according to an embodiment of the present disclosure. As shown in FIG. 1, the electronic apparatus 100 includes: a first measuring unit 101, a second measuring unit 102 and a generating unit 103. The first measuring unit 101 is configured to measure, based on acquired measurement configuration, new radio synchronized signals (NR-SSs) from a serving cell and one or more target cells, to acquire a first measurement result. The second measuring unit 102 is configured to measure, based on the measurement configuration, channel state information reference signals (CSI-RSs) from the serving cell and the one or more target cells, to acquire a second measurement result. The generating unit 103 is configured to generate a measurement repot containing the first measurement result and the second measurement result.

The first measuring unit 101, the second measuring unit 102 and the generating unit 103 may be implemented by one or more processing circuitries, which may be implemented as a chip, for example.

The electronic apparatus 100 may be located at user equipment (UE, which is also referred to as a user) side, for example. As an example, the user equipment may be implemented as a mobile terminal (such as a smart phone, a tablet personal computer (PC), a notebook PC, a portable game terminal, a portable/dongle mobile router and a digital camera) or a vehicle mounted terminal (such as a vehicle navigation device). The user equipment may also be implemented as a terminal performing machine to machine (M2M) communication (which is also referred to as a machine type communication (MTC) terminal). In addition, the electronic apparatus 100 may be a wireless communication module (such as an integrated circuit module including a single wafer) installed on each of the above terminals.

It should be understood that, although not shown in FIG. 1, the electronic apparatus 100 may further include a transceiving unit configured to communicate with a base station, so as to receive and transmit various signaling and data, such as the measurement configuration and the measurement report described above.

The measurement configuration may be provided by a base station of a current serving cell. The base station may be the same as or different from the base station of a target cell. The target cell may be an adjacent cell of the serving cell, for example. The measurement configuration may include configuration of, for example: which kind of physical quantity is to be measured, how to perform the measurement, and how to report the measurement result.

For example, in the embodiment, the electronic apparatus 100 measures two reference signals, NR-SS and CSI-RS, according to the measurement configuration. The measurement configuration may further include specifications for: a measurement period, whether to report periodically or report only in a case of satisfying a predetermined condition, a form of the reported message or the like. The NR-SS is composed of SS blocks, and mainly includes: primary synchronized signal (PSS), secondary synchronized signal (SSS) and physical broadcast channel (PBCH).

Figure 2:
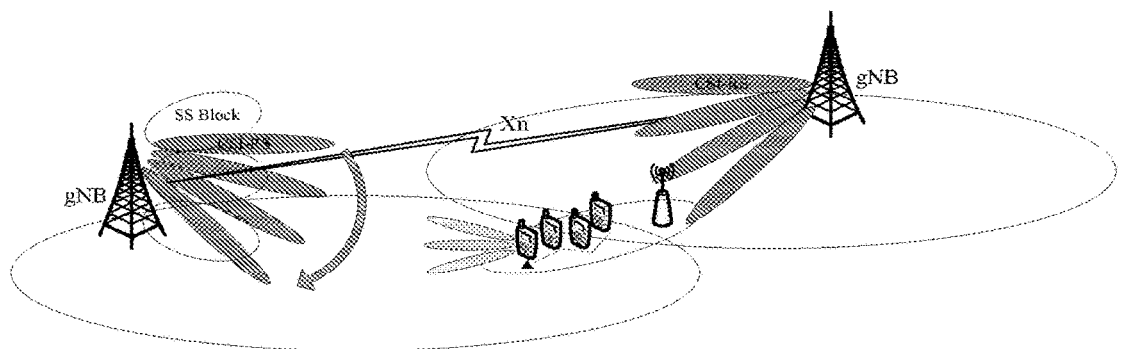
FIG. 2 is schematic diagram showing difference between NR-SS and CSI-RS in an emitting form according to an embodiment of the present disclosure.

As shown in FIG. 2, the NR-SS differs from the CSI-RS in an emitting form. In FIG. 2, a gNB represents a 5G base station. The NR-SS is a downlink synchronization and system message broadcast signal of the system, and has a characteristic of wide coverage. Therefore, the base station emits a relatively thick beam. The CSI-RS is a reference signal for the user to measure downlink channel quality, and is mainly with respect to a user currently communicating. Therefore, the base station emits a relatively thin beam and has strong focus. For the current serving cell, the user simultaneously measures reference signal receiving powers (RSRP) of the two reference signals. In general, since the thin beam has strong focus, a measurement result CSI-RSRP may be greater than a measurement result NR SS-RSRP. For multiple target cells possible for handover, only the SS-RSRP can be measured in a case that downlink synchronization is not realized. In a case that the serving cell notifies the user an offset value for realizing downlink synchronization with the target cell via high-layer signaling before measurement, the user may measure CSI-RS RSRP for the target cell based on the offset value.

In addition to the RSRP, the first measurement result and the second measurement result may also be reference signal receiving quality (RSRQ) or a signal to interference and noise ratio of reference signal (RS-SINR) of a corresponding signal. That is, the first measurement result and the second measurement result represent communication quality provided by the corresponding cell.

By measuring both the NR SS and the CSI RS, the quality of service capable of being provided by each cell can be reflected more accurately and comprehensively, thereby providing reference for various operations such as cell handover and cell reselection.

Figure 3:
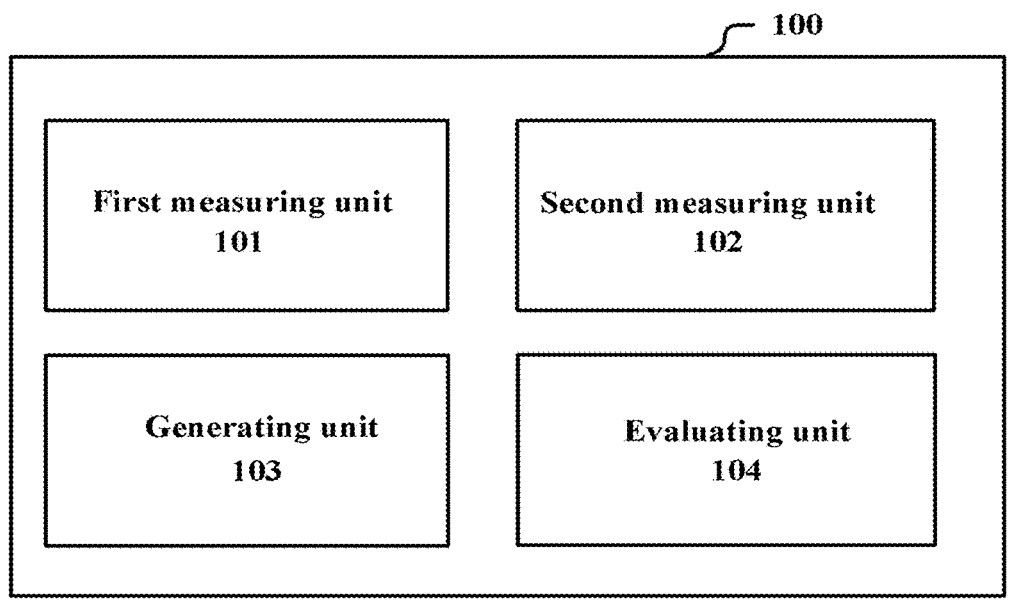
FIG. 3 is a block diagram of functional modules of an electronic apparatus for wireless communications according to an embodiment of the present disclosure.

FIG. 3 shows another block diagram of functional modules of the electronic apparatus 100. In addition to the units shown in FIG. 1, the electronic apparatus 100 further includes an evaluating unit 104, configured to evaluate various triggering events based on the first measurement result and the second measurement result. The evaluating unit 104 may be implemented as one or more processing circuitries, which may be implemented as a chip, for example.

As an example, the triggering events may include one or more of the following: communication quality of the serving cell being higher than a predetermined degree; the communication quality of the serving cell being lower than a predetermined degree; communication quality of a particular target cell being higher than the communication quality of the serving cell by a predetermined degree; and communication quality of a particular target cell being higher than a predetermined degree.

The evaluating unit 104 may represent two aspects of the communication quality using the first measurement result and the second measurement result respectively. That is, the communication quality may be represented separately by the first measurement result and the second measurement result. Alternatively, the evaluating unit 104 may represent the communication quality using a statistical average of the first measurement result and the second measurement result. For example, the statistical average may be obtained by setting statistical coefficients for the first measurement result and the second measurement result respectively.

In an example, at least a part of various triggering events are used to trigger handover from the serving cell to the target cell. That is, the triggering event is used to trigger a cell handover process. The specific examples of triggering events are described hereinafter by taking this as an example. It should be understood that aspects of the triggering events described below are only exemplary, rather than limiting the triggering events.

In the following description, the first measurement result of the serving cell is indicated by Msss, and the second measurement result of the serving cell is indicated by Mscsirs. The first measurement result of the target cell is indicated by Mnss, and the second measurement result of the target cell is indicated by Mncsirs.

First, a triggering event A1 is described. The triggering event A1 is used to describe a state in which the communication quality of the current serving cell becomes higher than a predetermined degree. In a case that the communication quality is represented separately by the first measurement result and the second measurement result, an entering condition for the triggering event A1 is considered to be satisfied in a case of satisfying the following inequality (1); and a leaving condition for the triggering event A1 is considered to be satisfied in a case of satisfying the following inequality (2).

$$Hsss-Hys>Thresh1 \&\& Hscsirs-Hys>Thresh2 \quad (1)$$

$$Msss+Hys<Thresh1 \&\& Mscsirs+Hys<Thresh2 \quad (2)$$

In which, Hys indicates a hysteresis parameter of the event, and Thresh1 and Thresh2 respectively indicate threshold parameters for the first measurement result and the second measurement result. In a case that the first measurement result and the second measurement result are RSRPs of a corresponding signal, a unit of Msss and Mscsirs is dBm. In a case that the first measurement result and the second measurement result are RSRQ or RS-SINR of a corresponding signal, the unit of Msss and Mscsirs is dB. The unit of Thresh1 and Thresh 2 is the same as the unit of Msss and Mscsirs. A unit of Hys is dB.

Therefore, according to the inequality (1) or (2), the evaluating unit 104 can evaluate that the condition for the triggering event A1 is satisfied, only when both the first measurement result and the second measurement result satisfy conditions in the inequality.

In another aspect, in a case that the communication quality is represented by the statistical average of the first measurement result and the second measurement result, the statistical average may be calculated according to the following equation (3).

$$Ms=a1*Msss+a2*Mscsirs \quad (3)$$

In which, a1 and a2 are statistical coefficients respectively. It should be understood that, the statistical average given in equation (3) is only exemplary rather than restrictive. In addition, the judgement of the entering condition and the leaving condition for the triggering event A1 may be performed according to the following inequalities (4) and (5) respectively.

$$Ms-Hys>Thresh \quad (4)$$

$$Ms+Hys<Thresh \quad (5)$$

In which, Thresh indicates a threshold parameter. In this case, the judgement manner for the entering condition and the leaving condition is the same as the corresponding judgement manner in the LTE system, and it is required to update only the threshold parameter.

Next, a triggering event A2 is described. The triggering event A2 is used to describe a state in which the communication quality of the current serving cell becomes lower than a predetermined degree. In a case that the communication quality is represented separately by the first measurement result and the second measurement result, an entering condition for the triggering event A2 is considered to be satisfied in a case of satisfying the following inequality (6); and a leaving condition for the triggering event A2 is considered to be satisfied in a case of satisfying the following inequality (7).

$$Msss-Hys<Thresh1 \,\&\&\, Mscsirs-Hys<Thresh2 \quad (6)$$

$$Msss+Hys>Thresh1 \,\&\&\, Mscsirs+Hys>Thresh2 \quad (7)$$

In the present disclosure, the same symbol indicates the same meaning, which is not explained repeatedly in general. According to the inequalities (6) and (7), the evaluating unit 104 can evaluate that the condition for the triggering event A2 is satisfied, in a case that both the first measurement result and the second measurement result satisfy the conditions in the inequality.

In another aspect, in a case that the communication quality is represented by the statistical average of the first measurement result and the second measurement result, the statistical average may still be calculated according to the equation (3), and judgement of the entering condition and the leaving condition for the triggering event A2 can be performed according to the following inequalities (8) and (9).

$$Ms+Hys<Thresh \quad (8)$$

$$Ms-Hys>Thresh \quad (9)$$

In which, Thresh indicates a threshold parameter for the triggering event A2. In this case, the judgment manner for the entering condition and the leaving condition is the same as the corresponding judgement manner in the LTE system, and it is required to update only the threshold parameter.

Third, a triggering event A3 is described. The triggering event A3 is used to describe a state in which the communication quality of a particular target cell becomes higher than the communication quality of the serving cell by a predetermined degree. In a case that the communication quality is represented separately by the first measurement result and the second measurement result, the entering condition for the triggering event A3 is considered to be satisfied in a case of satisfying the following inequality (10); and the leaving condition for the triggering event A3 is considered to be satisfied in a case of satisfying the inequality (11).

$$Mnss+Ofn+Ocn-Hys>Mpss+Ofp+Ocp+Off \,\&\&$$

$$Mncsirs+Ofn+Ocn-Hys>Mpcsirs+Ofp+Ocp+Off \quad (10)$$

$$Mnss+Ofn+Ocn+Hys>Mpss+Ofp+Ocp+Off \,\&\&$$

$$Mncsirs+Ofn+Ocn+Hys>Mpcsirs+Ofp+Ocp+Off \quad (11)$$

In which, Mpss and Mpcsirs respectively represent a first measurement result and a second measurement result of a primary cell/primary secondary cell (Pcell/PScell). Ofn represents a specific frequency offset of the target cell, Ocn represents a specific cell offset of the target cell and may be set to be 0 in a case of no configuration. Accordingly, Ofp represents a specific frequency offset of the target cell, Ocp represents a specific cell offset of the target cell and may be set to be 0 in a case of no configuration. Off represents an offset parameter of the event. Units of Ofn, Ofp, Ocn, Ocp and Off each are dB.

According to the inequalities (10) and (11), the evaluating unit 104 can evaluate that the condition for the triggering event A3 is satisfied in a case that both the first measurement results and the second measurement results of the serving cell and the target cell satisfy the conditions in the inequalities (10) and (11).

In another aspect, in a case that the communication quality is represented by the statistical average of the first measurement result and the second measurement result, the statistical average may be calculated according to the following equations (12) and (13), and judgement of the entering condition and the leaving condition for the triggering event A3 is performed according to the following inequalities (14) and (15).

$$Mn=a1*Mnss+a2*Mncsirs \quad (12)$$

$$Mp=a1*Mpss+a2*Mpcsirs \quad (13)$$

$$Mn+Ofn+Ocn-Hys>Mp+Ofp+Ocp+Off \quad (14)$$

$$Mn+Ofn+Ocn+Hys<Mp+Ofp+Ocp+Off \quad (15)$$

In this case, the judgement manner for the entering condition and the leaving condition is the same as the corresponding judgement manner in the LTE system, and it is required to update only the offset parameter.

Fourth, a triggering event A4 is described. The triggering event A4 is used to describe a state in which the communication quality of the particular target cell becomes higher than a predetermined degree. In a case that the communication quality is represented separately by the first measurement result and the second measurement result, the entering condition for the triggering event A4 is considered to be satisfied in a case of satisfying the following inequality (16); and the leaving condition for the triggering event A4 is considered to be satisfied in a case of satisfying the following inequality (17).

$$Mnss+Ofn+Ocn-Hys>Thresh1 \,\&\&\, Mncsirs+Ofn+Ocn-Hys>Thresh2 \quad (16)$$

$$Mnss+Ofn+Ocn-Hys>Thresh1 \,\&\&\, Mncsirs+Ofn+Ocn-Hys>Thresh2 \quad (17)$$

Therefore, according to the inequalities (16) and (17), the evaluating unit 104 can evaluate that the condition for the triggering event A4 is satisfied only in a case that both the first measurement result and the second measurement result satisfy the conditions in the inequalities (16) and (17).

In another aspect, in a case that the communication quality is represented by the statistical average of the first measurement result and the second measurement result, the statistical average may be calculated according to the previous equations (12) and (13), and judgement of the entering condition and the leaving condition for the triggering event A4 is performed according to the following inequalities (18) and (19).

$$Mn+Ofn+Ocn-Hys>Thresh \quad (18)$$

$$Mn+Ofn+Ocn+Hys<Thresh \quad (19)$$

In which, Thresh indicates a threshold parameter. In this case, the judgement manner for the entering condition and the leaving condition is the same as the corresponding judgement manner in the LTE system, and it is required to update only the threshold parameter.

In an example, the generating unit 103 may be configured to generate a measurement report in a case that a triggering condition for a certain triggering event is satisfied. The measurement report may further include an identifier of the triggering event. For example, in a case that the entering condition for the triggering event A1 is satisfied, the generating unit 103 may generate a measurement repot. In addition to the first measurement result and the second measurement result, the measurement report may further include an identifier of the triggering event A1, to notify the base station that which type of triggering event is adopted in performing the judgement. In another example, the generating unit 103 may generate a first measurement report based on the first measurement result and a second measurement report based on the second measurement result. The first measurement report and the second measurement report may be generated in a case that the triggering conditions for different triggering events are satisfied. For example, the generating unit 103 generates the first measurement report in a case that the first measurement result satisfies the triggering condition for the first triggering event, and generates the second measurement report in a case that the second measurement result satisfies the triggering condition for the second triggering event.

In addition, in a case that the triggering event whose triggering condition is satisfied is an event for triggering handover from the servicing cell to the target cell, the measurement report further includes an identifier of the handover target cell to be handed over to. For example, in a case that the entering condition for the triggering event A3 is satisfied and if the communication quality of the target cell C1 is higher than the communication quality of the current serving cell Pcell by a predetermined degree, the identifier of the target cell C1 is included in the measurement repot so as to be provided to the base station.

Different from the communication operating frequency band of LTE, when the NR operates at a high frequency point frequency band, a pair of reliable uplink/downlink beams are required to maintain normal communication. When performing cell handover, the user and the current serving cell has established the reliable beam pair to ensure normal communication. However, before the handover is completed, the user and the handover target cell do not have the reliable uplink/downlink beam pair. In order to ensure that the user can quickly find the best or relatively better beam of the handover target cell after the handover is completed, so as to determine the reliable uplink/downlink beam pair, beams of the handover target cell may be measured during a measurement process to obtain related information.

Specifically, the first measuring unit 101 and the second measuring unit 102 respectively measure NR SS and CSI RS of the target cell with respect to various beams of the target cell, to obtain one or more beams with the best measurement result, which are referred to as target beams hereinafter. The measurement report generated by the generating unit 103 further includes information on the target beams of the handover target cell.

In the NR system, in order to measure signal strength of a reference signal of the target cell at a current location of the user, the user needs to try to receive a synchronization signal and the reference signal of the target cell in various beam directions. During this process, the user may know the optimal receiving beam for the target cell. In order to increase reliability, the number of the optimal receiving beams may be more than one, for example, the first N (N≥1) beams with the strongest signal strength. Based on the optimal receiving beam, the user may feedback the most suitable transmitting beam for the target cell, and may include related information in the measurement report to provide to the base station of the current serving cell. When determining to perform the cell handover, the base station of the current serving cell provides the beam information to the base station of the handover target cell. The base station of the handover target cell may select the transmitting beam based on the beam information, for example. In a case that the base station of the handover target cell has beam reciprocity, the beam information may be further used to select the receiving beam.

In addition, the base station of the current serving cell may further provide the information on the beam pair used for communication between the user and the current serving cell to the handover target cell as reference, to reduce a beam scanning range or consumed time in the random access step.

In other words, the handover target cell may determine a part of beams as beams to which the user may randomly access in according to one or more of the following: information on the target beams provided by the user, and information of the beam pair currently used which is provided by the base station of the serving cell. In this way, the beam scanning range is reduced, and delay generated during the cell handover process is decreased.

Figure 4:
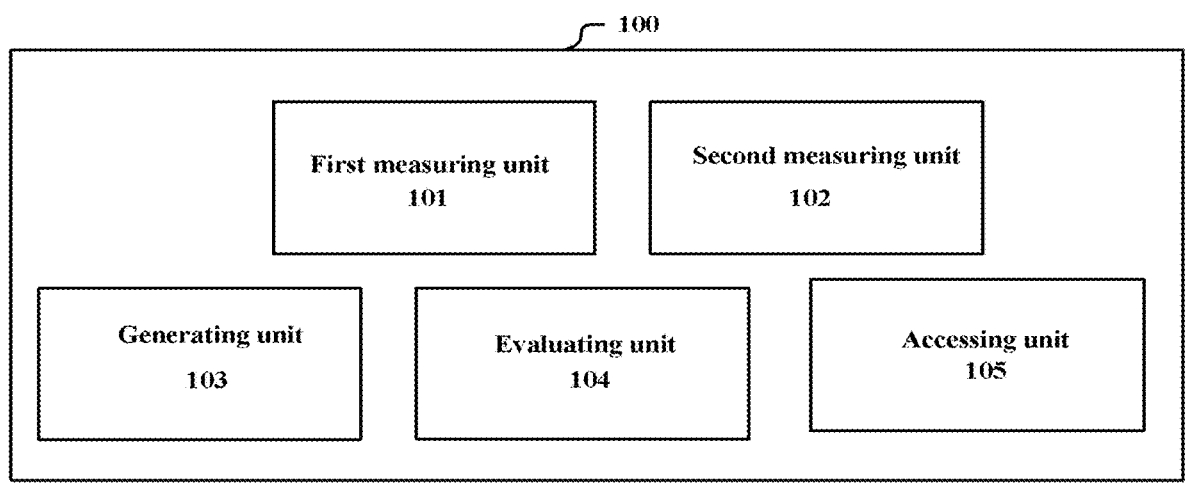
FIG. 4 is a block diagram of functional modules of an electronic apparatus for wireless communications according to an embodiment of the present disclosure.

Accordingly, as shown in FIG. 4, the electronic apparatus 100 may further include an accessing unit 105, configured to acquire information on the handover target cell and a part of beams of the handover target cell from the base station of the serving cell. The part of beams of the handover target cell is determined based on one or more of the following: target beams, and a beam pair used between the base station of the serving cell and the user. The accessing unit 105 may be implemented as one or more processing circuitries, and the processing circuit may be implemented as a chip, for example.

Since the user knows the information on the optimal beam during the measurement process, the accessing unit 105 is required to acquire only basic information on a part of beams, thereby reducing signaling overhead.

In addition, the accessing unit 105 may further select, based on the measurement result of the target beams, a beam to access in from among the part of beams of the handover target cell. For example, in a case of there being beam reciprocity, a beam with the highest signal strength may be selected to be accessed in.

In an example, the accessing unit 105 is further configured to perform the selecting based on whether there is dedicated Contention-Free based Random Access (CFRA) channel resource configuration on the corresponding beam. In the handover process, the random access channel (RACH) resources may be classified into two categories, that is, the contention-based random access (CBRA) channel resource and the CFRA channel resource. In order to reduce the delay in the handover process, the CFRA channel resource may be preferentially selected to access in. However, the CFRA channel resources are limited preserved dedicated resources, the base station may not configure the CFRA channel resource for the user in each beam direction. Therefore, the user may not only take the measurement result of the beam, but also whether there is a dedicated CFRA configuration for the beam into consideration when selecting the beam, and preferentially select the beam with the dedicated CFRA configuration, to reduce the delay as much as possible.

In the RACH resource and the corresponding beam information described here, the beam may include both the transmitting beam and the receiving beam of the handover target cell. In a case of there being beam reciprocity, the transmitting beam and the receiving beam represent the same beam. In this case, the user may select the transmitting beam to be used (which is the receiving beam for the base station of the handover target cell) based on the measurement result of the target beams and the status of the dedicated CFRA configuration, thereby determining RACH resources to transmit an access request such as Msg1.

In a case of there being no beam reciprocity, the receiving beam may be multiple beams based on historic reception conditions of signals. For example, the dedicated CFRA may be configured for multiple receiving beams with good historic reception conditions. In this case, the user may select a transmitting beam to be used (which is the receiving beam for the base station of the handover target cell) based on the status of the dedicated CFRA configuration, thereby determining RACH resources to transmit an access request such as Msg1.

As described above, the dedicated CFRA resources are limited. In order to sufficiently utilize the limited random access resources, a technology in which the access request is transmitted by multiplexing the dedicated CFRA resources of different beams is provided in the present disclosure. It should be understood that, although the technology is described in the embodiment, the technology is not limited to be applied in the embodiment and may be applied to any random access scenario.

In particular, the amount n of the dedicated CFRA resources configured for respective beams by the base station is less than the amount N of the resources to be used for transmitting the random access request. Therefore, the user may transmit the random access request by multiplexing the CFRA resource of ⌈N/n⌉ beams.

For example, the accessing unit 105 is configured to select the beam with the dedicated CFRA channel resource configuration, and configure to transmit an access request on the RACH resource corresponding to the selected beam and on the RACH resources corresponding to at least one other beams with the dedicated CFRA channel resource configuration.

There is no one-to-one correspondence between the beams and the RACH resources in the above method. Therefore, a beam index of the selected beam may be included in the access request for example, so as to enable the base station of the handover target cell to identify the beam selected by the user. For example, in a case that the accessing unit 105 selects a beam b1 and transmits an access request on the dedicated RACH resource corresponding to b1 and the dedicated RACH resource corresponding to another beam b2, the access request includes the beam index b1.

In addition, the existence of the beam index may also be used to indicate that the manner in which the dedicated CFRA channel resource configuration is multiplexed according to the present disclosure is adopted. In other words, if there is no beam index, the base station accordingly determines that the manner of multiplexing the dedicated CFRA channel resource configuration is not adopted. That is, there is a one-to-one correspondence between the RACH resources and the beams, and the base station may determine the beam selected by the user based on the location of the RACH resource.

In another example, it can be configured that there is a predetermined relationship between the beam indexes of the other beams described above and the beam index of the selected beam, so that the base station of the handover target cell determines the beam selected by the user based on the received access request. That is, a one-to-one correspondence between the actually selected beam and a beam group corresponding to the RACH resources for transmitting the access request may be established. In this case, the base station of the handover target cell may determine the beam actually selected by the user based on the RACH resources used in transmitting the access request.

For example, the beam index of the selected beam is less than the beam indexes of the other beams. In other words, the base station of the handover target cell may determine a beam with a minimum beam index among the beams corresponding to the RACH resources used in transmitting the access request as the beam actually selected by the user. In addition, the beam index of the selected beam may be larger than beam indexes of the other beams. In other words, the base station of the handover target cell may determine a beam with a maximum beam index among the beams corresponding to the RACH resources used in transmitting the access request as the beam actually selected by the user. It should be understood that, the configuration is only schematic rather than restrictive.

The access request is transmitted by multiplexing the dedicated CFRA resources of different beams, thereby sufficiently utilizing the dedicated CFRA resources and reducing the delay generated during the handover process.

In addition, in the NR high frequency point frequency band, centralized transmission of multiple beam directions can effectively resist high path fading. However, loss of the coverage performance is caused as compared with the original LTE system. Therefore, in the handover process, the mobility information of the user, such as a moving speed of the user, a location of the user and a moving direction of the user, is very important to selection of the receiving beam and the transmitting beam.

In an example, the measurement configuration may further include an indicator on whether it is necessary to report mobility information of a user.

In a case that the measurement configuration includes the indicator that it is necessary to report the mobility information of the user, the measurement report generated by the generating unit 103 further includes the mobility information of a corresponding user. When determining to perform cell handover, the base station of the current serving cell may provide the mobility information to the base station of the handover target cell, so as to assist selection of beam pairs.

The electronic apparatus 100 according to the embodiment of the present disclosure can evaluate the channel quality completely and accurately by measuring the NR SS and CSI RS of each cell, thereby efficiently performing operations such as cell handover. In addition, in the above measurement process, the measurement may be performed for the beams, thereby providing auxiliary information for beam selection of the handover target cell, effectively reducing the handover delay, and reducing signaling overhead. The electronic apparatus 100 may further provide the mobility information of the user, so as to assist selection of the beam pair for the handover target cell, thereby improving accuracy of the cell handover and improving the communication quality.

In addition, the technology in which the access request is transmitted by multiplexing the dedicated CFRA resources of different beams is further provided in the embodiment, so that the dedicated CFRA resources can be sufficiently utilized, thereby reducing the delay.

Second Embodiment

Figure 5:
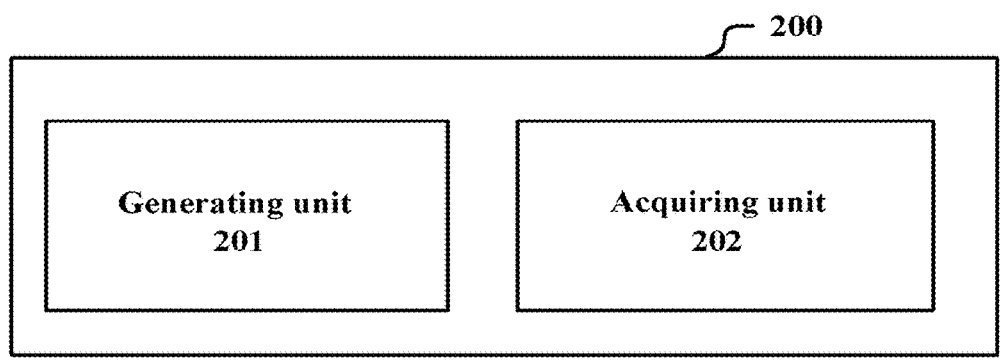
FIG. 5 is a block diagram of functional modules of an electronic apparatus for wireless communications according to another embodiment of the present disclosure.

FIG. 5 is a block diagram of functional modules of an electronic apparatus 200 for wireless communications according to another embodiment of the present disclosure. As shown in FIG. 5, the electronic apparatus 200 includes a generating unit 201 and an acquiring unit 202. The generating unit 201 is configured to generate information of measurement configuration for a user. The measurement configuration includes configuration for the user to measure NR-SSs from a serving cell and one or more target cells to acquire a first measurement result and configuration for the user to measure CSI-RSs from the serving cell and one or more target cells to acquire a second measurement result. The acquiring unit 202 is configured to acquire, from the user, a measurement report of the first measurement result and the second measurement result acquired by the user by measuring according to the measurement configuration.

The generating unit 201 and the acquiring unit 202 may be implemented as one or more processing circuitries. The processing circuitry may be implemented as a chip, for example. The electronic apparatus 200 may be located at a base station side, for example.

The measurement configuration generated by the generating unit 201 includes configuration for NR SS and configuration for CSI RS, and the user measures the NR SS and CSI RS according to measurement configuration respectively. As described above, the measurement configuration may include: a measurement period, whether to report periodically or report just in a case of satisfying a predetermined condition, a form of the reported message and so on.

The first measurement result and the second measurement result may include at least one of RSRP, RSRQ and RS-SINR of a corresponding signal.

In addition, the measurement configuration may further include an indicator on whether it is necessary to report the mobility information of the user. In a case that the measurement configuration includes an indicator that it is necessary to report the mobility information of the user, the measurement report further includes the mobility information of the user. The electronic apparatus 200 can provide the mobility information to the base station of the handover target cell, thereby assisting selection of the beam pair for the handover target cell.

The measurement report may be reported periodically by the user, or may be reported when a triggering condition for one type of various triggering events is satisfied. Examples of the triggering events are described in the first embodiment, which are not repeated here.

It should be understood that, although not shown in FIG. 5, the electronic apparatus 200 may further include a transceiving unit, configured to communicate with the user, so as to receive and transmit various signaling and data, such as the measurement configuration and the measurement report and so on. In addition, the transceiving unit may further communication with a core network and the base station of another cell, to exchange necessary information.

In a case that the measurement report is reported when the triggering condition for a certain triggering event is satisfied, the measurement report may further include an identifier of the triggering event, so that the base station of the serving cell can know which kind of triggering event is used by the user for judgement.

In a case that the triggering event whose triggering condition is satisfied is an event for triggering handover from the serving cell to the target cell, the measurement report further includes an identifier of the handover target cell to be handed over to. The base station of the serving cell, that is, the source base station, determines the handover target cell to be handed over to and determines whether it is capable of performing the handover based on the identifier. In a case that the source base station determines it is capable of performing the handover, a handover request is transmitted to the base station of the handover target cell, that is, the target base station. The target base station accordingly transmits a response to the handover request to the source base station. Information interchange between the source base station and the target base station may be performed via an interface X2 or S1. In some examples, the source base station and the target base station may be the same base station. In this case, the user expects to be handed from one cell of the base station over to another cell of the base station.

Figure 6:
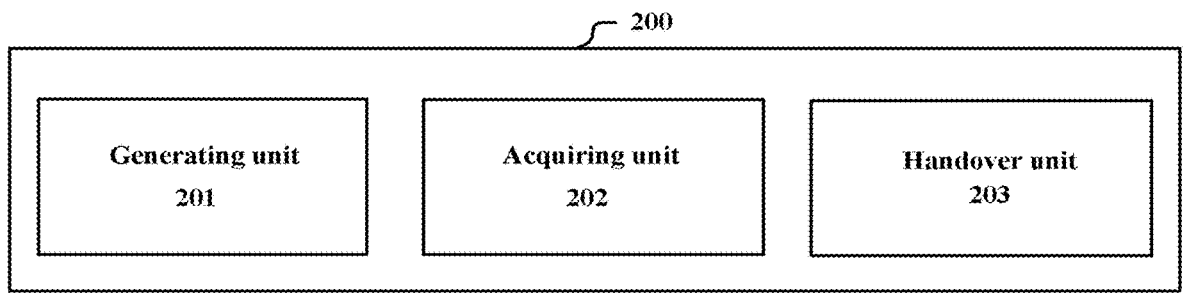
FIG. 6 is a block diagram of functional modules of an electronic apparatus for wireless communications according to another embodiment of the present disclosure.

In addition, the measurement report may further include information on one or more target beams with the best measurement result among the measurement results obtained by the user by measuring with respect to respective beams of the handover target cell. Accordingly, as shown in FIG. 6, the electronic apparatus 200 may further include a handover unit 203, configured to perform handover decision based on the measurement report, and provide information of the target beams and information on a beam pair used between the base station of the serving cell and the user to the base station of the handover target cell in a case that it is determined to perform handover.

As described above, the target beams are one or more beams with the best communication quality of the handover target cell measured by the user. Therefore, the base station of the handover target cell may select the transmitting beam with reference to the target beam. In addition, in a case that the receiving beam and the transmitting beam have reciprocity, the base station of the handover target cell may provide an available beam range to the user with reference to the target beam. That is, the base station of the handover target cell may select a beam to which the user can access in based on the target beams. In addition, a beam pair used between the base station of the serving cell and the user is a reliable beam pair, thereby providing reference for selection of the beam pair used between the handover target cell and the user.

The handover unit 203 is further configured to acquire, from the base station of the handover target cell, information of a part of beams of the handover target cell to which the user can access in, which is determined by the base station of the handover target cell based on the information of the target beams and/or information of the beam pair used between the base station of the serving cell and the user, and provide the information of the part of beams to the user. The user selects a certain beam of the handover target cell based on the information, and performs a random access operation.

The operations when the electronic apparatus 200 is located at the source base station side, that is, the cell corresponding to the electronic apparatus 200 is the serving cell, are described above. Operations when the electronic apparatus 200 is located at the target base station side, that is, the cell corresponding to the electronic apparatus 200 is the handover target cell, are described hereinafter.

In an example, the cell corresponding to the electronic apparatus 200 is determined as the handover target cell by the base station of another serving cell. That is, a user of another serving cell is to be handed over to a cell corresponding to the electronic apparatus 200 (referred to as the present cell) after performing measurement. The acquiring unit 202 is further configured to acquire, from a base station of another serving cell, information of one or more target beams with the best measurement result among the measurement results obtained by the user of the other serving cell by measuring with respect to each beam of the present cell, and information on a beam pair used between the another serving cell and its user. As described above, the information may be used to determine an available beam range which can be provided to the user. The information on the available beam range is provided to the above user of the other serving cell via the base station of the other serving cell. The user selects the beam to be used based on the available beam range, for example, and transmits an access request on a corresponding RACH resource.

The acquiring unit 202 is further configured to acquire an access request from the user, and the handover unit 203 determines the beam selected by the user based on the access request.

Similar to the first embodiment, in order to sufficiently utilize the dedicated CFRA channel resources, the following manner can be adopted: a random access request may be transmitted by multiplexing the dedicated CFRA channel resources of multiple beams.

In a case that the access request is transmitted on the RACH resources configured for respective beams as respective dedicated CFRA channel resources, the access request may include a beam index of the beam selected by the user to determine the beam selected by the user. In addition, the existence of the beam index may be used to indicate that the above multiplexing manner is adopted.

In addition, the handover unit 203 may determine the beam selected by the user based on a predetermined rule. The predetermined rule includes a predetermined relationship between a beam index of the beam selected by the user and beam indexes of other beams among the multiple beams. The predetermined rule may be written into the device when the system is initialized, or may be solidified in the device when the device leaves the factory.

In an example, the predetermined rule includes that the beam index of the beam selected by the user is less than the beam indexes of the other beams, or the beam index of the beam selected by the user is larger than the beam indexes of the other beams. In other words, the handover unit 203 may determine a beam with a minimum beam index among multiple beams corresponding to the RACH resources used in transmitting the access request as the beam selected by the user, or determine a beam with a maximum beam index among multiple beams as the beam selected by the user.

With the electronic apparatus 200 according to the embodiment, the user can be handed over to the handover target cell accurately and quickly, thereby reducing the handover delay and reducing signaling overhead.

In order to facilitate understanding, an information procedure for handover among a user (UE), a base station (S-gNB) of a serving cell and a base station (T-gNB) of the handover target cell is described with reference to FIG. 7 hereinafter. It should be noted that, the information procedure shown in FIG. 7 is only schematic rather than restrictive.

Figure 7:
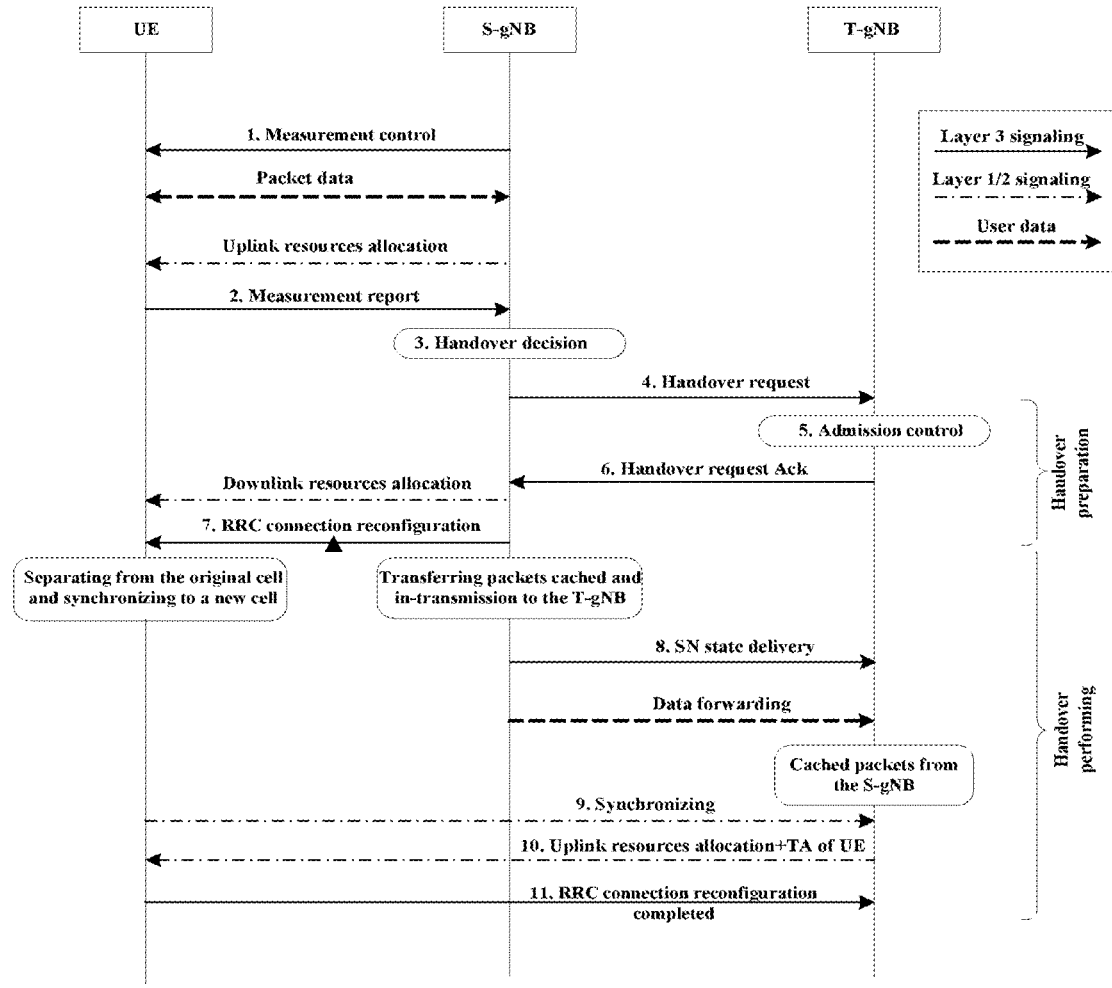
FIG. 7 is a schematic diagram of an information procedure among user equipment, a base station of a serving cell and a base station of a handover target cell.

As shown in FIG. 7, initially, the UE and the S-gNB are in a normal communication state. For example, transceiving of user data is performed between the UE and the S-gNB. In addition, the S-gNB transmits measurement control signaling to the UE on a layer 3 (radio link control layer, RLC layer), including information on the measurement configuration as described above, for example. The S-gNB allocates uplink transmission resource for the UE on layer 1 (physical layer) for subsequent report of the measurement report.

The UE measures, for example NR SS and CSI RS, based on the measurement configuration to obtain a first measurement result and a second measurement result, and generates a measurement report containing the first measurement result, the second measurement result and the like, to report the measurement report to the S-gNB periodically or in response to the triggering. As described above, the measurement report may further include one or more of the following: an identifier of the triggering event, an identifier of the handover target cell, information on a target beam of the handover target cell, mobility information of the UE and so on. For example, in a case that the UE determines that an entering condition of the triggering event for handover is satisfied based on the measurement result, the UE includes the identifier of the triggering event, the identifier of the handover target cell and the information of the beam in the measurement report and transmits to the S-gNB.

The S-gNB performs handover decision based on content in the measurement report. When the S-gNB determines to perform handover to the handover target cell, the S-gNB transmits a handover request to the base station T-gNB of the handover target cell. The handover request may further include information of the target beams of the cell reported by the UE, the mobility information of the UE, information of a beam pair used between the S-gNB and the UE, and the like. The g-NB performs admission control based on its resource usage conditions in response to the handover request, that is, determines whether to allow the UE to be handed over to the present cell. In a case of allowing to hand over, the T-gNB transmits a handover request Ack to the S-gNB. In addition, the T-gNB may further determines an available beam range of the UE based on the information of the target beams of the cell reported by the UE, the mobility information of the UE and the beam pair used between the S-gNB and the UE, and transmits the information of the available beam range to the S-gNB.

Next, the S-gNB allocates downlink transmission resource for the UE and transmits RRC connection reconfiguration signaling which may include mobile control information to the UE. In addition, the RRC connection reconfiguration signaling may further include information of the available beam range of the UE which is transmitted to the S-gNB from the T-gNB. At this time, the handover preparation is completed.

Subsequently, the handover implementation stage begins. The UE separates from the original cell and synchronizes to the new cell. The S-gNB transfers packets cached and being transmitted for the UE to the T-gNB, which includes a sequence number (SN), state transfer and data forwarding. The T-gNB caches the packets from the S-gNB.

Subsequently, the UE requests to synchronize to the T-gNB, the T-gNB allocates uplink transmission resources for the UE and notifies the UE of the time advance (TA), and the UE transmits the RRC connection reconfiguration completing signaling to the T-gNB.

In an example, in the step that the UE requests to synchronize to the T-gNB, the UE can select a transmitting beam to be used based on information of the available beam range and whether there is the allocated dedicated CFRA channel resource, and transmits a random access request to the T-gNB on the RACH resource corresponding to the beam and the RACH resources corresponding to one or more other beams allocated with dedicated CFRA channel resources. The T-gNB determines the beam actually selected by the UE with the method described in the embodiment for example, thereby performing allocation of the uplink transmission resources and notification of the TA. At this time, the handover is completed. The UE and the T-gNB may perform data transmission.

Subsequently, operations related to completing of the handover are required to be performed among the S-gNB, the T-gNB and the core network, for example, releasing of related resources in the S-gNB, requesting for path switching to the core network and so on. These steps are not directly related the concept of the present disclosure, and thus are not shown in FIG. 7.

Third Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method described below may be executed by a computer-executable program completely, although the hardware and/or firmware of the electronic apparatus for wireless communications can also be used in the methods.

Figure 8:
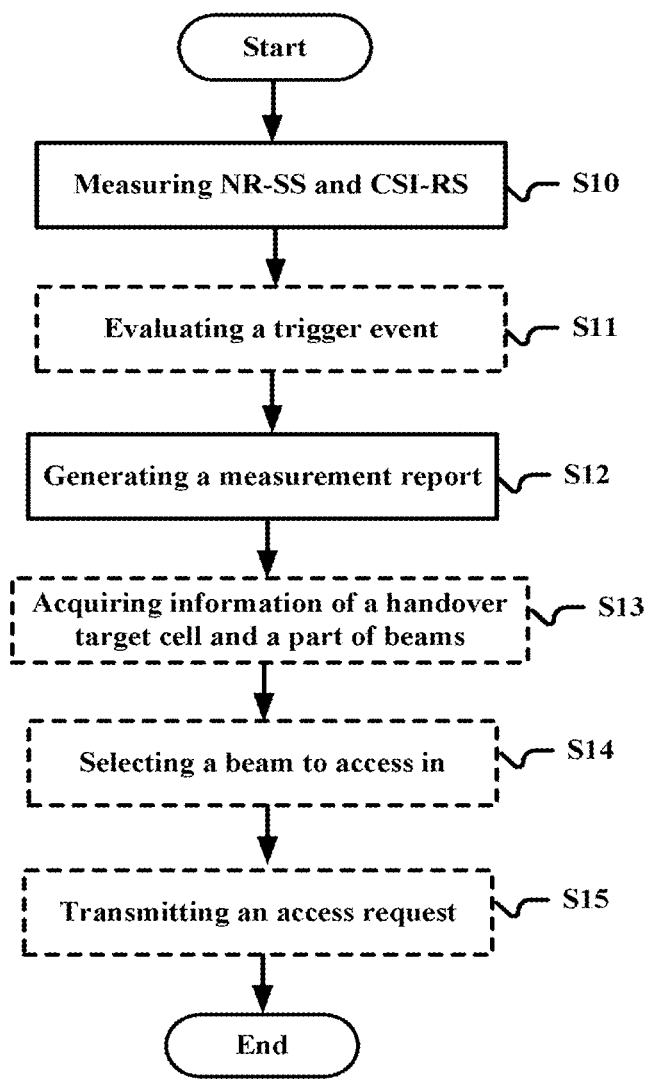
FIG. 8 is a flowchart of a method for wireless communications according to an embodiment of the present disclosure.

FIG. 8 is a flowchart of a method for wireless communications according to an embodiment of the present disclosure. The method includes: measuring, according to acquired measurement configuration, NR-SSs from a serving cell and one or more target cells to obtain a first measurement result; and measuring, based on the measurement configuration, CSI-RSs from the serving cell and the one or more target cells to obtain a second measurement result (S10); and generating a measurement report containing the first measurement result and the second measurement result (S12). The method is performed at the user side for example.

For example, the first measurement result and the second measurement result may include at least one of RSRP, RSRQ and RS-SINR of a corresponding signal.

As shown by a dashed line block shown in FIG. 8, the method may further include a step S11: estimating various triggering events according to the first measurement result and the second measurement result.

The communication quality of a corresponding cell may be represented by the first measurement result and the second measurement result. Two aspects of the communication quality may be represented by the first measurement result and the second measurement result respectively, or the communication quality may be represented by a statistical average of the first measurement result and the second measurement result. For example, the triggering event may include one or more of the following: the communication quality of the serving cell being higher than a predetermined degree; the communication quality of the serving cell being lower than the predetermined degree; and a communication quality of a particular target cell being higher than the communication quality of the serving cell by a predetermined degree; and the communication quality of the particular target cell being higher than the predetermined degree.

In an example, at least a part of triggering events are used to trigger handover from the serving cell to the target cell.

For example, step S12 may only be performed in a case that a triggering condition for one type of triggering event is satisfied, and the measurement report further includes an identifier of the triggering event. In a case that the triggering event whose triggering condition is satisfied is an event for triggering handover from the serving cell to the target cell, the measurement report may further include an identifier of the handover target cell to be handed over to.

In step S10, measurement may be performed with respect to respective beams of the target cell to obtain one or more target beams with the best measurement result. The measurement report further includes information on the target beams of the handover target cell.

As shown by another dashed line block of FIG. 8, in step S13, information of the handover target cell and a part of beams of the handover target cell is acquired from the base station of the serving cell. A part of beams of the handover target cell are determined based on one or more of the following: target beams, and a beam pair used between the base station of the serving cell and the user.

In step S14, a beam to be accessed in is selected from among the part of beams of the handover target cell. For example, the beam to be accessed in may be selected based on one or more of the following: a measurement result of the target beams, and whether there is a dedicated CFRA channel resource configuration for a corresponding beam.

In step S15, an access request is transmitted to the base station of the handover target cell. For example, a beam with the dedicated CFRA channel resource configuration is selected in step S14, and an access request is transmitted on the RACH resource corresponding to the selected beam and the RACH resources corresponding to at least one other beams with the dedicated CFRA channel resource configuration in step S15.

In an example, the access request may include a beam index of the selected beam.

In another example, beam indexes of the other beams and the beam index of the selected beam have a predetermined relationship, so that the base station of the handover target cell can determine the beam selected by the user based on the received access request. For example, the beam index of the selected beam is less than the beam indexes of the other beams, or the beam index of the selected beam is larger than the beam indexes of the other beams.

In addition, the measurement configuration may further include an indicator on whether it is necessary to report mobility information of the user. In a case that the measurement configuration includes an indicator that it is necessary to report the mobility information of the user, the measurement report further includes the mobility information of the corresponding user. For example, the mobility information of the user includes one or more of the following: a moving speed of the user, a location of the user and a moving direction of the user.

Figure 9:
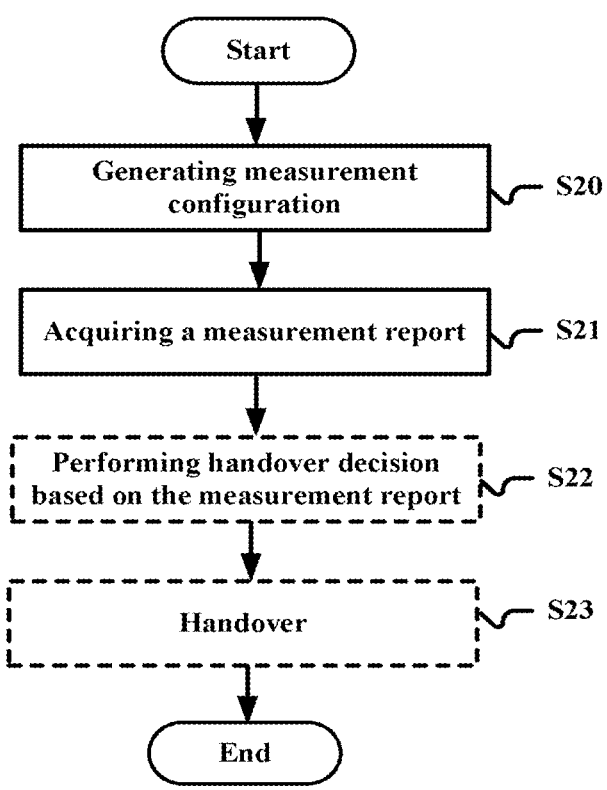
FIG. 9 is a flowchart of a method for wireless communications according to another embodiment of the present disclosure.

FIG. 9 is a flowchart of a method for wireless communications according to another embodiment of the present disclosure. The method includes: generating information of measurement configuration for a user (S20), where the measurement configuration includes configuration for the user to measure NR-SSs from a serving cell and one or more target cells to obtain a first measurement result, and configuration for the user to measure CSI-RSs from the serving cell and one or more target cells to obtain a second measurement result; and acquiring, from the user, a measurement report of the first measurement result and the second measurement result obtained by the user by measuring according to the measurement configuration (S21). The method is performed at the base station side, for example.

For example, the measurement report is acquired in a case that a triggering condition for one type of various triggering events is satisfied, and the measurement report further includes an identifier of the triggering event. In a case that the triggering event whose triggering condition is satisfied is an event for triggering handover from the serving ell to the target cell, the measurement report further includes an identifier of the handover target cell to be handed over to.

In an example, the measurement report further includes information of one or more target beams with the best measurement result among the measurement results obtained by the user by measuring with respect to respective beams of the handover target cell.

As shown by a dashed line block of FIG. 9, the above method may further include the following steps: performing handover decision based on the measurement report (S22); and performing cell handover in a case of determining to perform handover (S23). In step S23, information of the target beams and information of a beam pair used between the base station of the serving cell and the user may be provided to the base station of the handover target cell.

In step S23, information of a part of beams of the handover target cell to which the user can access in, which is determined by the base station of the handover target cell based on information of the target beams and/or the information of the beam pair used between the base station of the serving cell and the user, is acquired from the base station of the handover target cell, and the information is provided to the user.

In addition, the measurement configuration may further include an indicator on whether it is necessary to report mobility information of the user. In a case that the measurement configuration includes the indicator that it is necessary to report the mobility information of the user, the measurement report obtained in step S21 further includes the mobility information of the user.

In addition, in a case that a cell corresponding to a main body performing the above method is determined as the handover target cell by the base station of anther serving cell, the above method may further include the following step (not shown in FIG. 9): acquiring, from the base station of another serving cell, information of one or more target beams with the best measurement result among the measurement results obtained by the user of the other serving cell by measuring with respect to each beam of the present cell, and information of a beam pair used between the base station of the other serving cell and the user.

The method may further include the following step: acquiring an access request from the user, and determining the beam selected by the user based on the access request.

In an example, the access request includes a beam index of the beam selected by the user.

In another example, in a case that the access request is transmitted on the RACH resources configured for multiple beams as respective dedicated CFRA channel resources, the beam selected by the user may be determined based on a predetermined rule. The predetermined rule includes a predetermined relationship between the beam index of the beam selected by the user and the beam indexes of the other beams among the multiple beams. For example, the predetermined rule includes that the beam index of the beam selected by the user is less than the beam indexes of the other beams, or the beam index of the beam selected by the user is larger than the beam indexes of the other beams.

It should be noted that the above methods may be used in combination or separately. Details are described in detail in the first and second embodiments, which are not repeated herein.

APPLICATION EXAMPLES

The technology of the present disclosure may be applied to various products. The base station descried above may be implemented as any type of evolved node B (eNB) or gNB (5G base station). The eNB includes a macro eNB and a small eNB for example. The small eNB such as a pico eNB, micro eNB and a home (femto-cell) eNB may have a smaller coverage range than a macro cell. The similar situation holds for the gNB. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments may each operate as the base station by temporarily or semi-persistently executing a base station function.

[Application Examples Regarding a Base Station]

First Application Example

Figure 10:
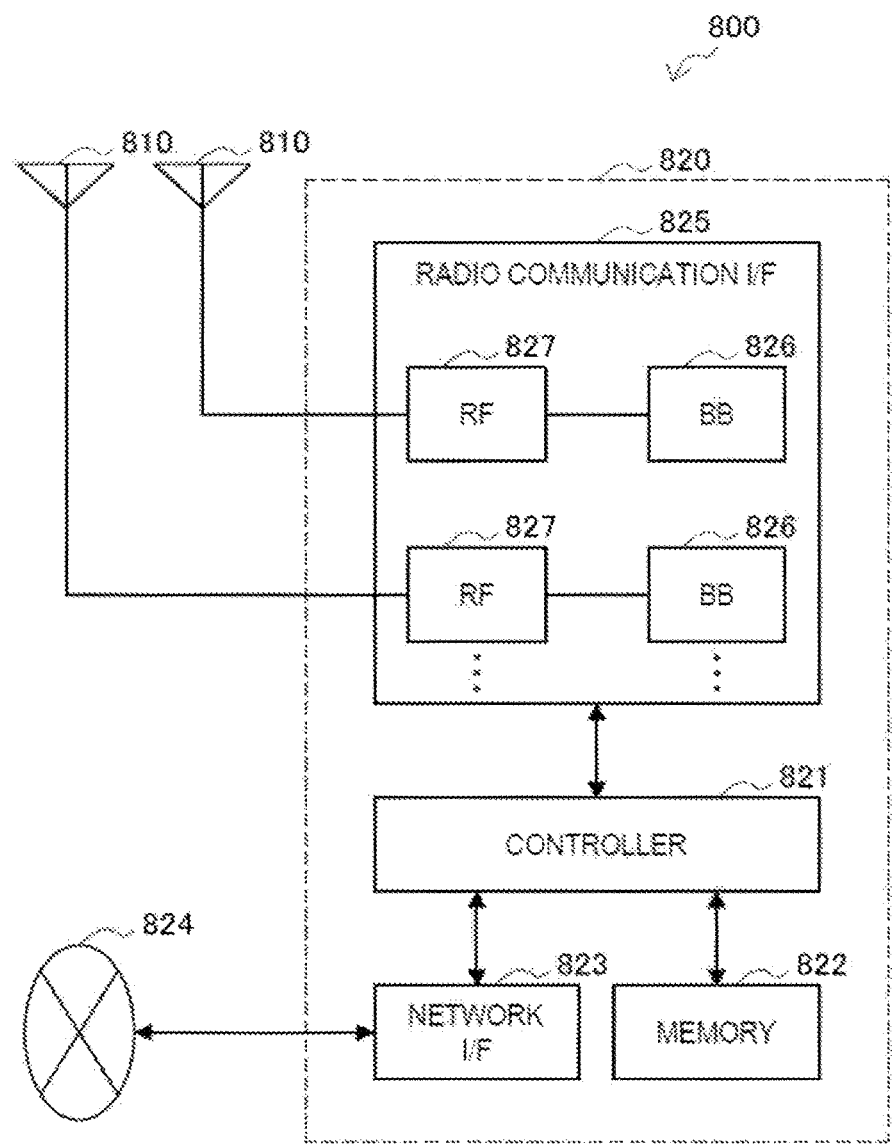
FIG. 10 is a block diagram illustrating a first example of a schematic configuration of an eNB or gNB to which the technology of the present disclosure may be applied.

FIG. 10 is a block diagram illustrating a first example of a schematic configuration of an eNB or gNB to which the technology of the present disclosure may be applied. It is noted that the following description is made by taking the eNB as an example, but it also adapts to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antenna elements (such as multiple antenna elements included in a multiple-input multiple-output (MIMO) antenna), and is used for the base station apparatus 820 to transmit and receive wireless signals. As shown in FIG. 17, the eNB 800 may include the multiple antennas 810. For example, the multiple antennas 810 may be compatible with multiple frequency bands used by the eNB 800. Although FIG. 10 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a radio communication interface for wireless backhaul. If the network interface 823 is a radio communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 10, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 10. For example, the multiple RF circuits 827 may be compatible with multiple antenna elements. Although FIG. 10 shows the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 10, the transceiving unit of the electronic apparatus 200 and the acquiring unit 202 described with reference to the FIG. 5 and FIG. 6 may be implemented by the radio communication interface 825. At least a part of the functions may be implemented by the controller 821. For example, the controller 821 may generate the measurement configuration and acquire the measurement report by performing the functions of the generating unit 201 and the acquiring unit 202, and may perform the handover from the serving cell to the handover target cell by performing the function of the handover unit 203.

Second Application Example

Figure 11:
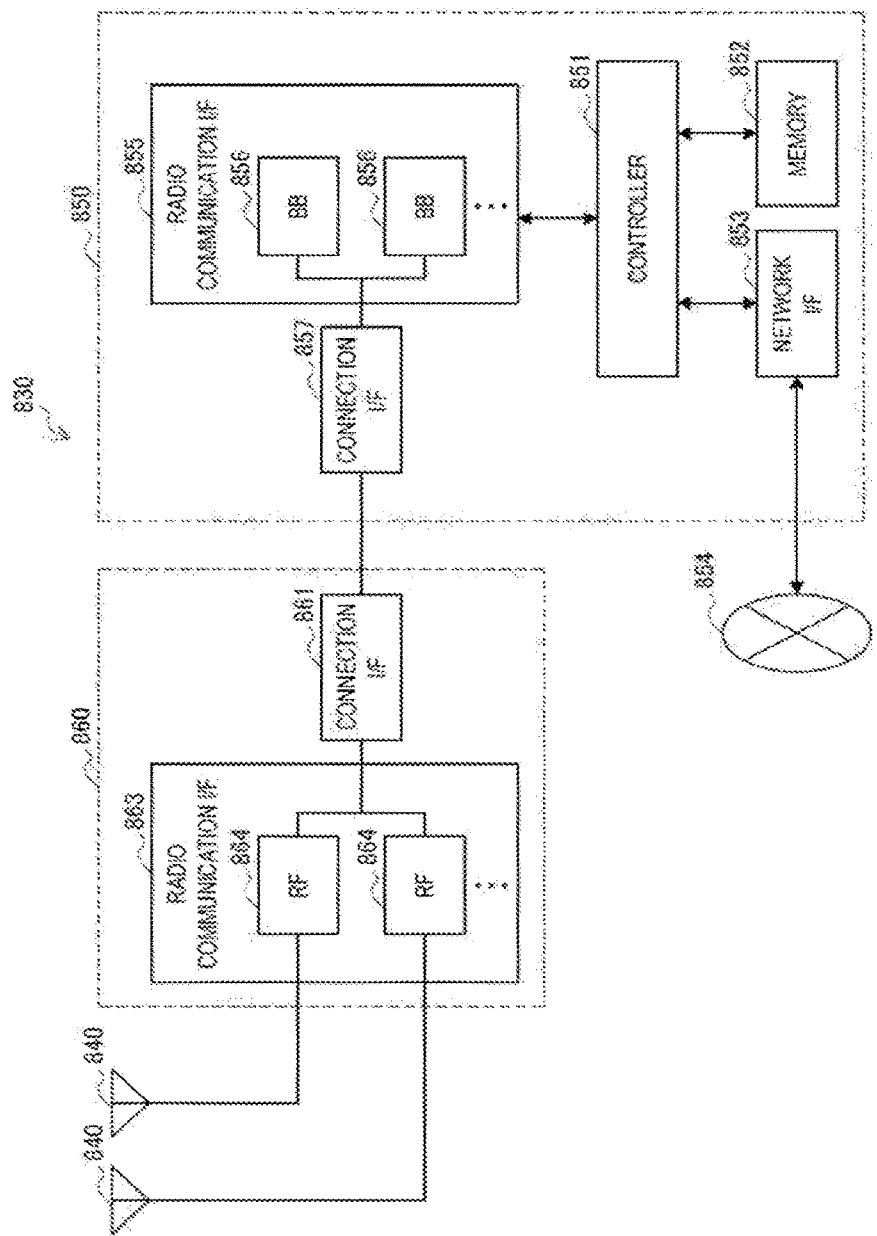
FIG. 11 is a block diagram illustrating a second example of a schematic configuration of an eNB or gNB to which the technology of the present disclosure may be applied.

FIG. 11 is a block diagram illustrating a second example of a schematic configuration of an eNB or gNB to which the technology of the present disclosure may be applied. It is noted that the following description is made by taking the eNB as an example, but it also adapts to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 11, the eNB 830 may include the multiple antennas 840. For example, the multiple antennas 840 may be compatible with multiple frequency bands used by the eNB 830. Although FIG. 11 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except that the BB processor 856 is connected to an RF circuit 864 of the RRH 860 via the connection interface 857. As show in FIG. 11, the radio communication interface 855 may include the multiple BB processors 856. For example, the multiple BB processors 856 may be compatible with multiple frequency bands used by the eNB 830. Although FIG. 11 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 11. For example, the multiple RF circuits 864 may support multiple antenna elements. Although FIG. 11 shows the example in which the radio communication interface 863 includes the multiple RF circuits 864, the radio communication interface 863 may also include a single RF circuit 864.

In the eNB 830 shown in FIG. 11, the transceiving unit of the electronic apparatus 200 and the acquiring unit 202 described with reference to the FIG. 5 and FIG. 6 may be implemented by the radio communication interface 825. At least a part of the functions may be implemented by the controller 821. For example, the controller 821 may generate the measurement configuration and acquire the measurement report by performing the functions of the generating unit 201 and the acquiring unit 202, and may perform the handover from the serving cell to the handover target cell by performing the function of the handover unit 203.

[Application Examples Regarding User Equipment]

First Application Example

Figure 12:
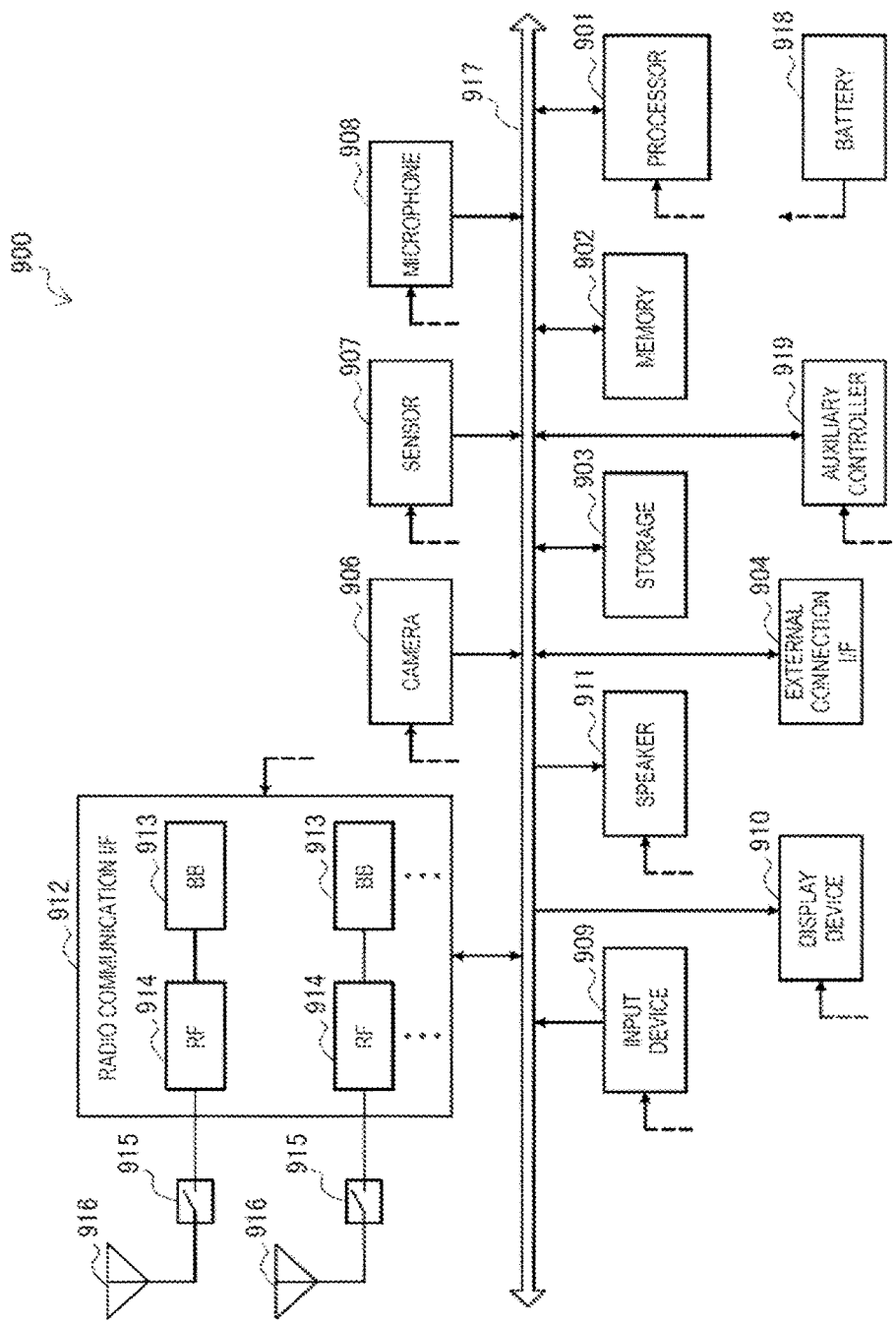
FIG. 12 is a block diagram illustrating an example of a schematic configuration of a smart phone to which the technology of the present disclosure may be applied.

FIG. 12 is a block diagram showing an example of a schematic configuration of a smart phone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or an information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case where one RF link is connected to one antenna, which is only illustrative and a case where one RF link is connected to multiple antennas through multiple phase shifters may exist. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 12. Although FIG. 12 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 12 via feeder lines that are partially shown as dashed lines in FIG. 12. The auxiliary controller 919, operates a minimum necessary function of the smart phone 900, for example, in a sleep mode.

In the smart phone 900 shown in FIG. 12, the transceiving unit of the electronic apparatus 100 may be implemented by the radio communication interface 912. At least a part of the function may be implemented by the processor 901 or the auxiliary controller 919. The processor 901 or the auxiliary controller 919 may generate the measurement report by performing the functions of the first measuring unit 101, the second measuring unit 102 and the generating unit 103, evaluate the triggering event by performing the function of the evaluating unit 104, and perform the function of accessing to the handover target cell by performing the function of the accessing unit 105.

Second Application Example

Figure 13:
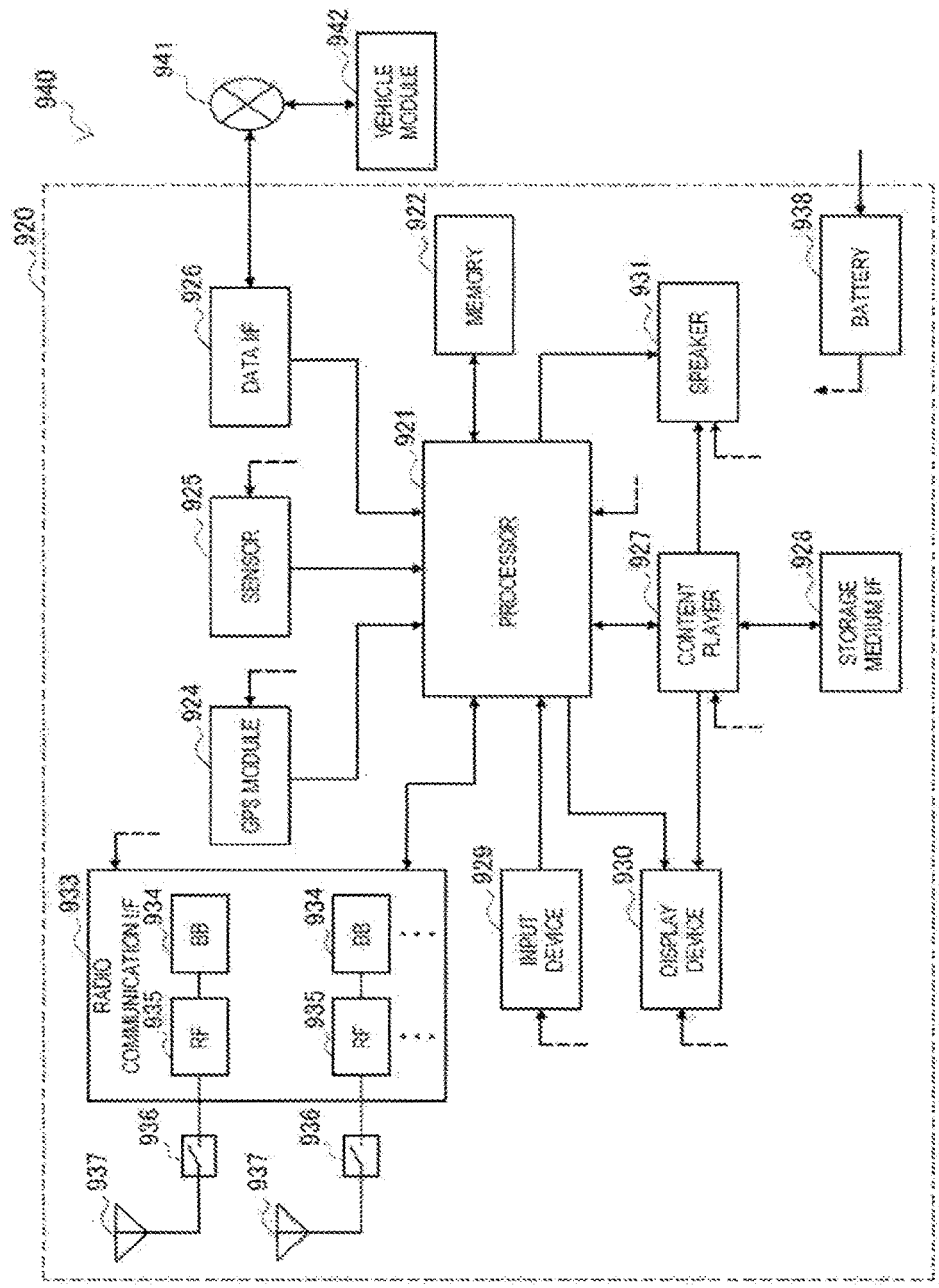
FIG. 13 is a block diagram illustrating an example of a schematic configuration of an car navigation device to which the technology of the present disclosure may be applied.

FIG. 13 is a block diagram showing an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 13, the car navigation apparatus 920 may include the multiple antennas 937. Although FIG. 13 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 13 via feeder lines that are partially shown as dash lines in FIG. 13. The battery 938 accumulates power supplied from the vehicle.

In the car navigation device 920 shown in FIG. 13, the transceiving unit of the electronic apparatus 100 may be implemented by the radio communication interface 912. At least a part of the functions may be implemented by the processor 901 or the auxiliary controller 919. For example, the processor 901 or the auxiliary controller 919 generate the measurement report by performing the functions of the first measuring unit 101, the second measuring unit 102 and the generating unit 103, evaluate the triggering event by performing the function of the evaluating unit 104, and perform the function of accessing to the handover target cell by performing the function of the accessing unit 105.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In a case of implementing the present disclosure in software or firmware, the program consisting of the software is installed to a computer with a dedicated hardware structure (such as a general purpose computer 1400 shown in FIG. 14) from the storage medium or network. The computer, when being installed with the various programs, performs various functions.

Figure 14:
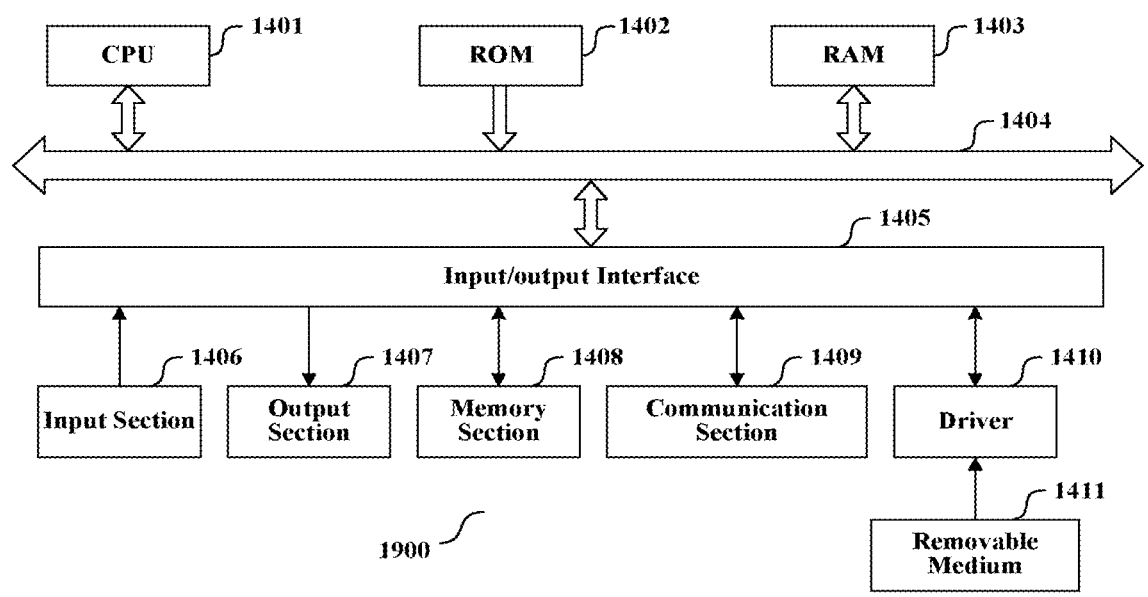
FIG. 14 is a block diagram of an exemplary block diagram illustrating the structure of a general purpose personal computer capable of realizing the method and/or device and/or system according to the embodiments of the present disclosure.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporarily in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus located at a user equipment for wireless communications, comprising:
processing circuitry, configured to:
acquire a single measurement configuration message including a single measurement configuration from a base station of a serving cell of the user equipment, wherein the single measurement configuration includes a single measurement reporting format, a measurement period and an indication whether the user equipment should report periodically or should report based on an occurrence of various trigger events;
wherein the single measurement configuration further comprises each of:
a first measurement configuration to enable the user equipment to measure a signal strength of new radio synchronization signals (NR-SSs) from each of a serving cell of the base station and a second cell, and
a second measurement configuration to enable the user equipment to measure a signal strength of channel state information reference signals (CSI-RSs) from each of the serving cell of the base station and the second cell; and
based on the acquired single measurement configuration;
measure a signal strength of the NR-SSs from each of the serving cell and the second cell, and generate a first measurement result, and
measure a signal strength of the CSI-RSs from each of the serving cell and the second cell, and generate a second measurement result; and
in accordance with the single measurement configuration, in response to determining that a triggering condition of a triggering event being satisfied, generate and transmit a single measurement report message including a single measurement report comprising each of the first measurement result and the second measurement result, the single measurement report including an identifier of the triggering event;
wherein the processing circuitry is further configured to determine the triggering event as being satisfied by evaluating whether any of the various triggering events has occurred based on each of the first measurement result and the second measurement result,
wherein one of the various triggering events is a trigger event for triggering a handover of the user equipment from the serving cell to the second cell;
wherein, in a case that the triggering event whose triggering condition is satisfied is the trigger event for triggering the handover of the user equipment from the serving cell to the second cell, the single measurement report further comprises an identifier that identifies the second cell as a handover target cell of the user equipment; and
wherein the processing circuitry is further configured to, when measuring the signal strengths of the NR-SS and the CSI-RS of the second cell;
perform a signal strength measurement with respect to each beam of a plurality of beams of the second cell and
select a beam from the plurality of beams of the second cell that has a highest measured signal strength as a target beam for the handover,
wherein the single measurement report further comprises information about the selected target beam.

2. The electronic apparatus according to claim 1, wherein, the processing circuitry is further configured to acquire, from the base station of the serving cell, information of the handover target cell and information about which of the plurality of beams of the second cell that the user equipment can access for the handover.

3. The electronic apparatus according to claim 1, wherein the various triggering events comprise a set of triggering events the set including each of the following:
   a cell-specific communication quality of the serving cell being higher than a predetermined degree;
   a cell-specific communication quality of the serving cell being lower than a predetermined degree;
   a cell-specific communication quality of a cell other than the serving cell being better than a cell-specific communication quality of the serving cell by a predetermined degree; and
   a cell-specific communication quality of a particular target cell being higher than a predetermined degree.

4. The electronic apparatus according to claim 1, wherein the single measurement configuration further comprises an indicator indicating whether the user equipment is to include mobility information of the user equipment in the single measurement report.

5. The electronic apparatus according to claim 4, wherein, in a case that the single measurement configuration comprises the indicator, the single measurement report further comprises the mobility information of the user equipment,
   wherein the mobility information of the user equipment comprises each of the following:
   a moving speed of the user equipment,
   a location of the user equipment, and
   a moving direction of the user equipment.

6. The electronic apparatus according to claim 1, wherein the target beam has a beam specific dedicated Contention-Free based Random Access channel resource configuration.

7. The electronic apparatus according to claim 6, wherein, the processing circuitry is further configured to transmit an access request on a first random access channel resource corresponding to the selected target beam and on a second random access channel resource corresponding to another beam of the plurality of beams of the second cell also having the dedicated Contention-Free based Random Access channel resource configuration.

8. The electronic apparatus according to claim 7, wherein the selected target beam and the another beam have beam indexes with a predetermined relationship, such that a base station of the handover target cell identifies the target beam selected by the user equipment based on the access request received on the first and second random access channel resources.

9. An electronic apparatus located at a base station for wireless communications, comprising:
   processing circuitry, configured to:
   generate information of a single measurement configuration message including a single measurement configuration for a user equipment served by a serving cell of the base station,
   wherein the single measurement configuration includes a measurement reporting format, a measurement period and an indication whether the user equipment should report periodically or should report based on an occurrence of various trigger events;
   wherein the single measurement configuration further comprises each of:
   a first measurement configuration to enable the user equipment to measure a signal strength of new radio synchronization signals (NR-SSs) from each of a serving cell of the base station and a second cell so as to generate a first measurement result, and
   a second measurement configuration to enable the user equipment to measure a signal strength of channel state information reference signals (CSI-RSs) from each of the serving cell and the second cell so as to generate a second measurement result; and
   acquire, from the user equipment, single measurement report message including a single measurement report that includes each of the first measurement result and the second measurement result with respect to each beam of a plurality of beams of the second cell, the single measurement report including an identifier of a triggering event of the various triggering events, the triggering event having a triggering condition that was satisfied to trigger the user equipment to generate the measurement report;
   wherein, in a case that the triggering event whose triggering condition is satisfied is an event for triggering a handover from the serving cell to the second cell, the single measurement report further comprises an identifier that identifies the second cell as a handover target cell of the user equipment;
   wherein the single measurement report further comprises information about a beam selected by the user equipment, from the plurality of beams of the second cell, as having a highest measured signal strength as a target beam.

10. The electronic apparatus according to claim 9, wherein the processing circuitry is further configured to provide to the user equipment information of the handover target cell and information about which of the plurality of beams of the second cell that the user equipment can access for the handover.

11. The electronic apparatus according to claim 10, wherein the processing circuitry is further configured to acquire, from a base station of the handover target cell, the information of the handover target cell and the information about which of the plurality of beams of the second cell that the user equipment can access for the handover.

12. A method performed by a user equipment for wireless communications, comprising:
   acquiring a single measurement configuration message including a single measurement configuration from a base station of a serving cell of the user equipment,
   wherein the single measurement configuration includes a measurement reporting format, a measurement period and an indication whether the user equipment should report periodically or should report based on an occurrence of various trigger events;
   wherein the single measurement configuration further comprises each of:
   a first measurement configuration to enable the user equipment to measure a signal strength of new radio synchronization signals (NR-SSs) from each of a serving cell of the base station and a second cell, and
   a second measurement configuration to enable the user equipment to measure a signal strength of channel state information reference signals (CSI-RSs) from each of the serving cell of the base station and the second cell; and
   based on the acquired single measurement configuration:
   measuring a signal strength of the NR-SSs from each of the serving cell and the second cell, and generate a first measurement result, and measuring a signal strength of the CSI-RSs from each of the serving cell and the second cell, and generate a second measurement result; and in accordance with the single measurement configuration, in response to determining that a triggering condition of a triggering event being satisfied, generating and transmitting a single measurement report message including a single measurement report comprising the first measurement result and the second measurement result, the single measurement report including an identifier of the triggering event;

wherein the method further comprises determining the triggering event as being satisfied by evaluating whether any of the various triggering events has occurred based on each of the first measurement result and the second measurement result, wherein one of the various triggering events is a trigger event for triggering a handover of the user equipment from the serving cell to the second cell;

wherein, in a case that the triggering event whose triggering condition is satisfied is the trigger event for triggering the handover of the user equipment from the serving cell to the second cell, the single measurement report further comprises an identifier that identifies the second cell as a handover target cell of the user equipment; and wherein the method further comprises, when measuring the signal strengths of the NR-SS and the CSI-RS of the second cell;

performing a signal strength measurement with respect to each beam of a plurality of beams of the second cell, and selecting a beam from the plurality of beams of the second cell that has a highest measured signal strength as a target beam for the handover, wherein the single measurement report further comprises information about the selected target beam.

13. The method according to claim 12, further comprising;

wherein the various triggering events comprise a set of triggering events the set including each of the following:

a cell-specific communication quality of the serving cell being higher than a predetermined degree;

a cell-specific communication quality of the serving cell being lower than a predetermined degree;

a cell-specific communication quality of a cell other than the serving cell being better than a cell-specific communication quality of the serving cell by a predetermined degree; and a cell-specific communication quality of a particular target cell being higher than a predetermined degree.

14. The method according to claim 12, wherein the single measurement configuration further comprises an indicator indicating whether the user equipment is to include mobility information of the user equipment in the measurement report.

15. The method according to claim 14, wherein, in a case that the single measurement configuration comprises the indicator, the single measurement report further comprises the mobility information of the user equipment, wherein, the mobility information of the user equipment comprises each of the following:

a moving speed of the user equipment, a location of the user equipment, and a moving direction of the user equipment.

16. The method according to claim 12, wherein the target beam has a beam specific dedicated Contention-Free based Random Access channel resource configuration.

17. The method according to claim 16, further comprising:

transmitting an access request on a first random access channel resource corresponding to the selected target beam and on a second random access channel resource corresponding to another beam of the plurality of beams of the second cell also having the dedicated Contention-Free based Random Access channel resource configuration.

18. The method according to claim 17, wherein the selected target beam and the another beam have beam indexes with a predetermined relationship, such that a base station of the handover target cell identifies the target beam selected by the user equipment based on the access request received on the first and second random access channel resources.

* * * * *